United States Patent
Mahnkopf

(10) Patent No.: US 9,868,428 B2
(45) Date of Patent: Jan. 16, 2018

(54) BRAKE BOOSTER AND METHOD FOR OPERATING A BRAKE BOOSTER

(75) Inventor: Dirk Mahnkopf, Eglosheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 633 days.

(21) Appl. No.: 13/880,816

(22) PCT Filed: Sep. 5, 2011

(86) PCT No.: PCT/EP2011/065246
§ 371 (c)(1),
(2), (4) Date: Jul. 23, 2013

(87) PCT Pub. No.: WO2012/059259
PCT Pub. Date: May 10, 2012

(65) Prior Publication Data
US 2013/0305706 A1    Nov. 21, 2013

(30) Foreign Application Priority Data

Nov. 2, 2010 (DE) .................. 10 2010 043 202

(51) Int. Cl.
*B60T 13/52* (2006.01)
*B60T 7/04* (2006.01)
(Continued)

(52) U.S. Cl.
CPC .............. *B60T 13/52* (2013.01); *B60T 7/042* (2013.01); *B60T 7/12* (2013.01); *B60T 8/441* (2013.01);
(Continued)

(58) Field of Classification Search
CPC .............. B60T 7/02; B60T 7/04; B60T 7/042
See application file for complete search history.

(56) References Cited

U.S. PATENT DOCUMENTS 3,751,919 A * 8/1973 Ron ................... B60T 13/162
60/553
6,269,731 B1 * 8/2001 Gautier ............... B60T 8/3275
91/369.2
(Continued)

FOREIGN PATENT DOCUMENTS

CN    103180181    6/2013
DE    197 36 997    3/1999
(Continued)

OTHER PUBLICATIONS

International Search Report, dated Dec. 20, 2011, issued in corresponding PCT Application No. PCT/EP2011/065246.

*Primary Examiner* — Michael Leslie
*Assistant Examiner* — Richard Drake
(74) *Attorney, Agent, or Firm* — Norton Rose Fulbright US LLP; Gerard Messina

(57) ABSTRACT

A brake booster includes an input element actuatable by a driver, an actuator for generating a support force, an output element that receives at least one of an input or support force and that applies an actuating force to a piston of a brake master cylinder, a force transmission unit having elastic properties and transmitting the input and/or support forces to the output element, and a preload unit acting on the force transmission unit to apply a force couple to the force transmission unit when the brake booster is in idle mode. A method for operating the brake booster includes generating a support force prior to a braking intent to be anticipated or immediately after detection of a braking intent, in a time span before or immediately after detection of an actuation of the input element.

19 Claims, 2 Drawing Sheets

(51) Int. Cl.
*B60T 7/12* (2006.01)
*B60T 8/44* (2006.01)
*B60T 13/66* (2006.01)
*B60T 13/74* (2006.01)
*B60T 17/22* (2006.01)

(52) U.S. Cl.
CPC .......... *B60T 13/662* (2013.01); *B60T 13/745* (2013.01); *B60T 17/22* (2013.01); *B60T 2201/12* (2013.01)

(56) References Cited

U.S. PATENT DOCUMENTS

| | | | |
|---|---|---|---|
| 7,367,187 B2 * | 5/2008 | Ikeda | B60T 13/746 60/545 |
| 8,874,343 B2 * | 10/2014 | Anderson | B60T 13/745 303/114.3 |
| 2005/0253450 A1 * | 11/2005 | Giering | B60T 7/042 303/115.1 |
| 2006/0163941 A1 * | 7/2006 | Von Hayn | B60T 7/042 303/155 |
| 2012/0265417 A1 * | 10/2012 | Vollert | B60T 13/745 701/70 |

FOREIGN PATENT DOCUMENTS

| WO | WO 2009/083216 | 7/2009 |
|---|---|---|
| WO | WO 2010/069832 | 6/2010 |

\* cited by examiner

BRAKE BOOSTER AND METHOD FOR OPERATING A BRAKE BOOSTER

CROSS-REFERENCE TO RELATED APPLICATIONS

The present application is the national stage entry of International Patent Application No. PCT/EP2011/065246, filed on Sep. 5, 2011, which claims priority to Application No. DE 10 2010 043 202.4, filed in the Federal Republic of Germany on Nov. 2, 2010.

FIELD OF INVENTION

The present invention relates to a brake booster and a method for operating a brake booster.

BACKGROUND INFORMATION

In vehicles having conventional disk brakes, in the unbraked operating state, i.e., when the brake pedal is not actuated, energy losses in the form of a residual braking torque often occur, since the brake pads rub against the brake disk. Such rubbing may be caused, for example, by disk knocking and/or in many cases by incorrect pad return and the correct clearing not being maintained.

In order to save energy, disk brakes have therefore been developed in which the brake in the unbraked state is in a so-called zero drag position, so that no rubbing occurs between the brake pads and the brake disk. An appropriately designed brake caliper is often referred to as a zero drag caliper.

A disadvantage with such braking systems, however, is that after the brake pedal is released the brake pads often retract a long way from the brake disk, so that when the brake actuating element is actuated there is increased free or dead travel compared to conventional braking systems. Such additional free or dead travel, however, is undesirable and should therefore be avoided or compensated for. In this connection it should be pointed out that such increased free or dead travel may also result from the design of the system irrespective of whether or not zero drag calipers are used.

Compensation for such undesirable free or dead travel has previously been possible only through the use of so-called non-muscular-energy braking systems, in which the energy necessary for generating the braking force is generated by one or multiple energy supply devices, but not by the physical effort of the driver.

SUMMARY

A brake booster according to the present invention includes an input element which is actuatable by the driver, an actuator for generating a support force, an output element to which an input force or the support force may be applied with the aid of the input element and/or the actuator and via which an actuating force may be applied to a piston of a brake master cylinder, and a force transmission unit having elastic properties which is situated between the input element and the actuator on the one hand and the output element on the other hand and transmits the input force and/or the support force to the output element. In addition a preload unit is provided which acts upon the force transmission unit in such a way that with the brake booster in idle mode the preload unit applies a force couple to the force transmission unit.

In a method according to the present invention for operating a brake booster according to the present invention, a support force is generated by the actuator prior to a braking intent to be anticipated or immediately after detection of a braking intent in a time span prior to or immediately after detection of an actuation of the input element.

The present invention is based on the underlying idea of designing a brake booster in such a way that undesirable free or dead travel in the braking system are compensated for without noticeable impact on the feel of the pedal, for example in the form of a shift of the brake actuating element. This is achieved according to the present invention in that a preload unit acts upon the force transmission unit of a brake booster in such a way that with the brake booster in the idle mode the preload unit applies a force couple to the force transmission unit. If, prior to a braking intent to be anticipated or immediately after detection of a braking intent, in a time span prior to or immediately after detection of an actuation of the input element, a support force is generated by the actuator; an appropriate design of the preload unit and thus of the force couple and the support force generated prior to a braking intent to be anticipated or immediately after detection of a braking intent makes it possible to override a predefined travel at the output of the brake booster and thus at the piston of the brake master cylinder, without a corresponding travel having to be present at the input of the brake booster and thus at the input element. The free or dead travel may thereby be compensated, without the driver noticing it, for example through a corresponding shift of the input element.

In comparison to the complex and expensive implementation of a non-muscular-energy braking system, the design of a brake booster according to the present invention represents a particularly simple and therefore inexpensive variant to the compensation for free or dead travel in braking systems. The brake booster according to the present invention and the operating method according to the present invention are furthermore notable in that dead travel in the area of the brake caliper and also dead travel in the area of the brake master cylinder may be compensated for. In addition the compensation occurs without the driver's noticing it, thereby ensuring very pleasant driving.

A further advantageous application of the brake booster according to the present invention or of the operating method according to the present invention arises when used in a hybrid or electric vehicle. In such vehicles, the non-muscular-energy mode of the brake booster may be used during the blending state of a generator torque. When the brake is applied, the pressure is initially built up as part of the compensation for the dead travel. If a generator torque is added, the hydraulic braking torque may be reduced accordingly, so that the entire braking torque remains constant. In this case brake fluid flows back out of the braking system into the brake master cylinder, as a result of which the force transmission unit shifts toward the brake actuating element. In a conventional braking system the air gap has to be made sufficiently large so that there is no contact between the force transmission unit and the input element. In a brake booster according to the present invention or with the use of the operating method according to the present invention, on the other hand, the air gap does not have to be enlarged, which means among other factors that in the event of failure of the brake booster there is no increased free travel. Since during the blending stage there is no direct connection between the braking system and the brake actuating element, there is no feedback effect from the brake actuating element, i.e., the feel of the pedal remains constant.

The present invention may be used regardless of the type of brake booster, which means the actuator of the brake booster may be a pneumatic or a hydraulic or an electro-hydraulic or an electromechanical or an electrothermal actuator.

Since the force transmission unit and in particular the stiffness of it is unchanged or only slightly changed by comparison with conventional brake boosters, no difference in behavior results even in the event of a failure of the brake booster, and in particular there is no significant increase in the actuating force of the driver to achieve a desired deceleration.

According to one exemplary embodiment of the present invention, the force transmission unit, which may be designed as an elastically deformable reaction disk or an elastic spring construction, is designed in such a way that a deviation of the ratio of the support force to the input force from a predefined ratio results in a deflection of the force transmission unit.

According to a further exemplary embodiment of the present invention, the preload unit has a force generation unit which in the idle mode actively applies a first force of the force couple to the force transmission unit.

One exemplary embodiment of the present invention which is particularly simple in construction and thus cost-effective results if the force generation unit is designed as a spring element which is preloaded in the idle mode of the brake booster, the spring element resting on one side on the force transmission unit. A return spring of the brake booster or a spring of the master brake cylinder may act as the spring element, for example.

A further reduction in design complexity and expense may be achieved in that the second force necessary for creating the force couple is implemented in the form of a reaction force. This may be achieved in that the preload unit includes a reaction unit which generates a reaction force to the first force, which together with the first force then forms the force couple.

The reaction force may be generated in a particularly simple manner in that the reaction unit includes a stop, on which the force transmission unit directly or indirectly rests.

According to one exemplary embodiment of the present invention, the input element has a first subcomponent, actuatable by the driver, for generating the input force and a second subcomponent, separate from it, for transmitting the input force to the force transmission unit. The stop is situated in such a way that, with the brake booster in the idle mode, the side of the second subcomponent of the input element facing away from the force transmission unit rests on the stop. This exemplary embodiment has the advantage that the stop may be situated not directly at the force transmission unit, but in an area between the force transmission unit and the input element, which significantly increases design flexibility. Therefore, better consideration may be taken for specific general conditions of the braking system or adjacent vehicle components, for example with regard to installation space.

This advantage may also be achieved as an alternative in that the input element is situated movably in a tube, which in the idle mode of the brake booster is in contact with the force transmission unit and rests with its side facing away from the force transmission unit on the stop.

In order to implement a so-called jump-in function, an adjustable air gap may be provided between the input element and the force transmission unit or between the first and the second subcomponents of the input element. This air gap has the effect that the driver, upon actuation of the input element, initially does not have to press against the force transmission unit, but may move it with a low level of force. The control or regulation of the actuator force takes place in this area as a function of the travel of the input element at virtually constant input force. The actuating force is produced in this area primarily by the actuator. The size of the air gap defines the size of the so-called jump-in, i.e., that force or that pressure at which the braking system transfers from a non-muscular-energy mode to an energy-assisted mode.

An additional compensation for undesirable free or dead travel in the braking system may be implemented in that the air gap in the idle mode is set to be smaller or larger than a desired air gap at the beginning of a braking operation. If prior to a braking intent to be anticipated or immediately after detection of a braking intent, in a time span prior to or immediately after detection of an actuation of the input element, a support force is generated by the actuator, then a predefined travel at the output of the brake booster and thus at the piston of the brake master cylinder is overridden. Since in this time span, however, there is still no connection between the input element and the force transmission unit, this action has no effect on the actuating element and consequently will not be noticed by the driver. The overridden travel at the output of the brake booster and the related changes at the force transmission unit directly affect, from a design-dependent support force, the air gap between the input element and the force transmission unit or between the first and the second subcomponents of the input element. Without further measures the air gap necessary for implementing a desired jump-in function would become too large or too small, depending on the deformations of the force transmission unit and of the brake master cylinder caused by the support force. This may be compensated for in that the air gap in the idle mode is set to be smaller or larger than a desired air gap at the beginning of a braking operation.

Further features and advantages of exemplary embodiments of the present invention are described in the following, with reference to the accompanying drawings.

DETAILED DESCRIPTION

Figure 1:
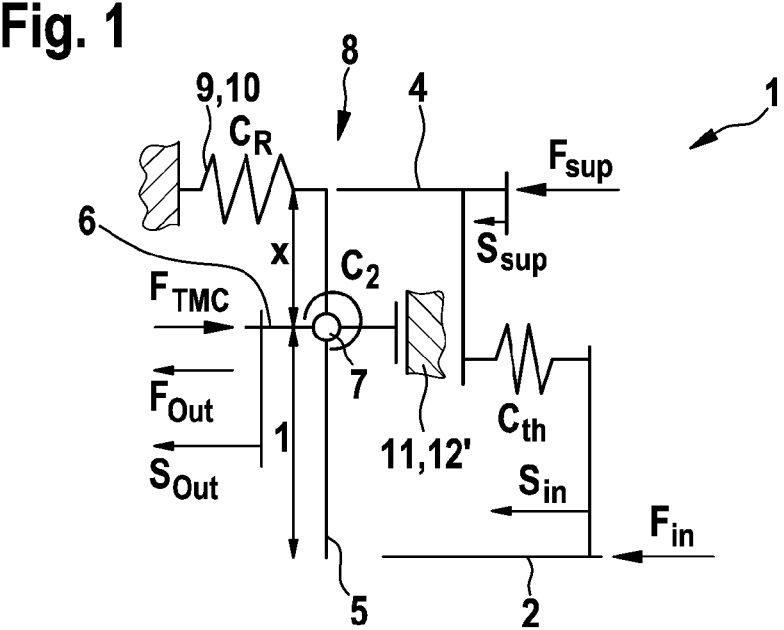
FIG. 1 shows an equivalent diagram of a first exemplary embodiment of a brake booster according to the present invention.
Figure 2:
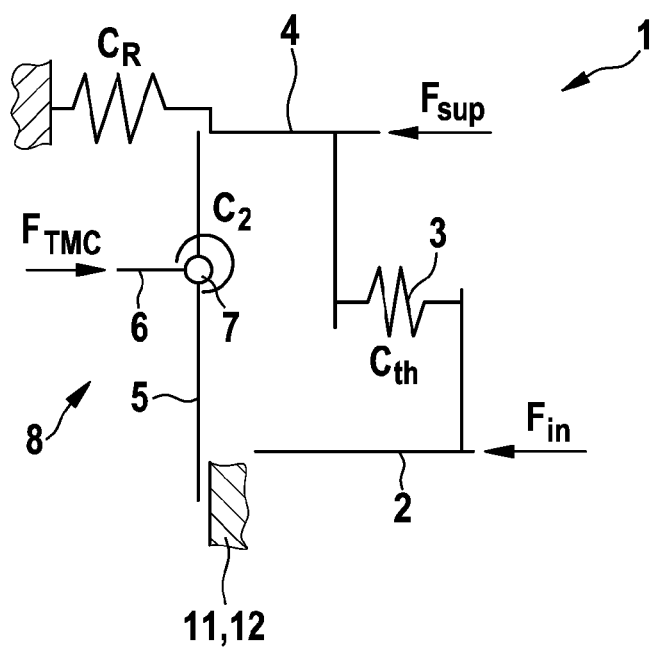
FIG. 2 shows an equivalent diagram of a second exemplary embodiment of a brake booster according to the present invention.
Figure 3:
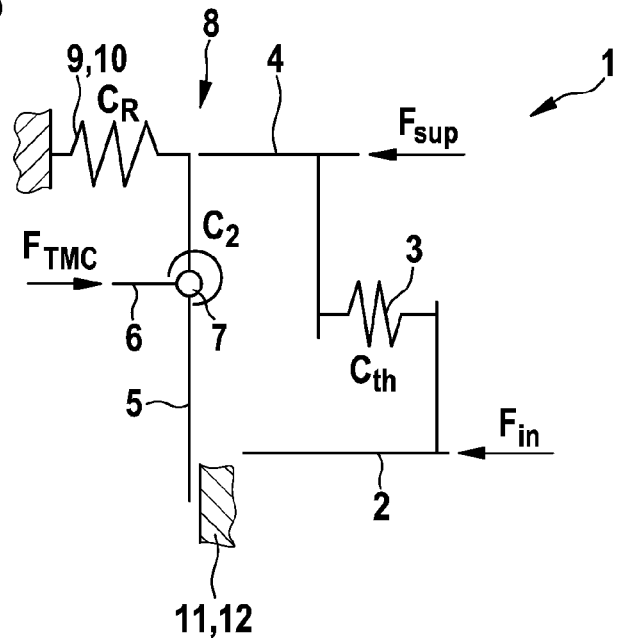
FIG. 3 shows an equivalent diagram of a third exemplary embodiment of a brake booster according to the present invention.

FIGS. 1 through 3 show, on the basis of equivalent diagrams, various exemplary embodiments of a brake booster 1 according to the present invention. An input element 2 is mechanically coupled to a brake actuating element, not shown, which for example may be designed as a brake pedal or a brake lever, and is thus actuatable by a driver. If an input force $F_{in}$, which is greater than a force threshold value, acts on input element 2, which for example may be designed as an input piston, then the latter shifts by a distance $S_{in}$. Here input force $F_{in}$ generally corresponds to an actuating force of the driver. The force threshold value is represented in FIGS. 1 through 3 in the form of a spring element 3 having a stiffness $C_{th}$ and a spring preload $F_{th}$. An actuator, not shown, may apply a support force $F_{sup}$ to a booster body 4, which results in an adjustment travel $S_{sup}$ of booster body 4. The actuator may be designed in any form, for example pneumatic or hydraulic or electrohydraulic or electromechanical or electrothermal. Booster body 4 may be designed, for example, as a backup piston. Via a force transmission unit 5, which has elastic properties, input force $F_{in}$ and support force $F_{sup}$ are combined into an output force $F_{out}$ and transmitted to an output element 6. Output element 6 shifts here by a distance $S_{out}$. Output element 6 is mechanically coupled to a piston, not shown, of a brake master cylinder, to which a (brake) actuating force may be applied by the force transmission unit. Force transmission unit 5 is designed in such a way that a deviation of the ratio of the support force $F_{sup}$ to the input force $F_{in}$ from a predefined ratio results in a deflection or deformation of force transmission unit 5. Force transmission unit 5 is thus designed as a force balance, which may be implemented in the form of an elastically deformable reaction disk or an elastic spring construction. From output element 6, a force $F_{TMC}$ acts on the force transmission unit which results from the preload of the springs in the brake master cylinder and, where applicable, from a pre-pressure. For the sake of clarity, some of the variables referred to are shown only in FIG. 1.

The equivalent diagrams of brake booster 1 furthermore contain variables which characterize force transmission unit 5. For example, force transmission unit 5 has a stiffness $C_2$. In addition, a point of contact 7 of output element 6 on force transmission unit 5 is apparent in FIG. 1. A quotient X indicates the ratio of distance x between point of contact 7 and a point of application on booster body 4 as well as the distance between point of contact 7 and a point of application on input element 4 (shown here as length 1). Here the lever lengths, i.e., lengths "x" and "1", correspond for example to contact surfaces between input element 2 or booster body 4 and a reaction disk. Solely for the sake of clarity, point of contact 7 and the lever lengths are not shown in FIGS. 2 and 3.

In particular during the use of so-called zero drag calipers or also as a result of system design, undesirable free or dead travel may occur in the area of the braking system. In order to compensate for this, a brake booster 1 according to the present invention has a preload unit 8, which acts upon force transmission unit 5 in such a way that in the idle mode of brake booster 1, which is shown in FIGS. 1 through 3, it applies a force couple to force transmission unit 5.

Preload unit 8 has a force generation unit 9, which in the idle mode actively applies a first force of the force couple to force transmission unit 5. In the exemplary embodiments according to FIGS. 1 through 3, force generation unit 9 is formed by a spring element. In the exemplary embodiments according to FIGS. 1 and 3, a preloaded return spring 10 of brake booster 1 having a stiffness $C_R$ serves as force generation unit 9. In the exemplary embodiment according to FIG. 2, a preloaded spring, not shown, of the brake master cylinder serves as force generation unit 9. As an alternative, the first force, which is applied actively to force transmission unit 5 in the idle mode, may also be generated by any other force generation unit 9, as for example an electric motor.

Preload unit 8 also includes a reaction unit 11, which generates a reaction force to the first force. The reaction force together with the first force then forms the force couple. In the exemplary embodiments according to FIGS. 1 through 3, reaction unit 11 includes a stop 12' (FIG. 1) and 12 (FIGS. 2 and 3), on which force transmission unit 5 directly or indirectly rests and with the aid of which a reaction force to the first active force is generated.

As an alternative to the depicted exemplary embodiments with a reaction unit 11, both forces of the force couple may also be generated actively. Thus it is conceivable, for example, to replace reaction unit 11 by an electric motor which actively applies a counter-force to the first force to force transmission unit 5.

The mode of operation of a brake booster 1 according to the present invention will be explained below by way of example on the basis of FIG. 4, which shows, schematically and highly simplified, a concrete, exemplary embodiment of a brake booster according to the equivalent wiring diagram according to FIG. 3.

Figure 4:
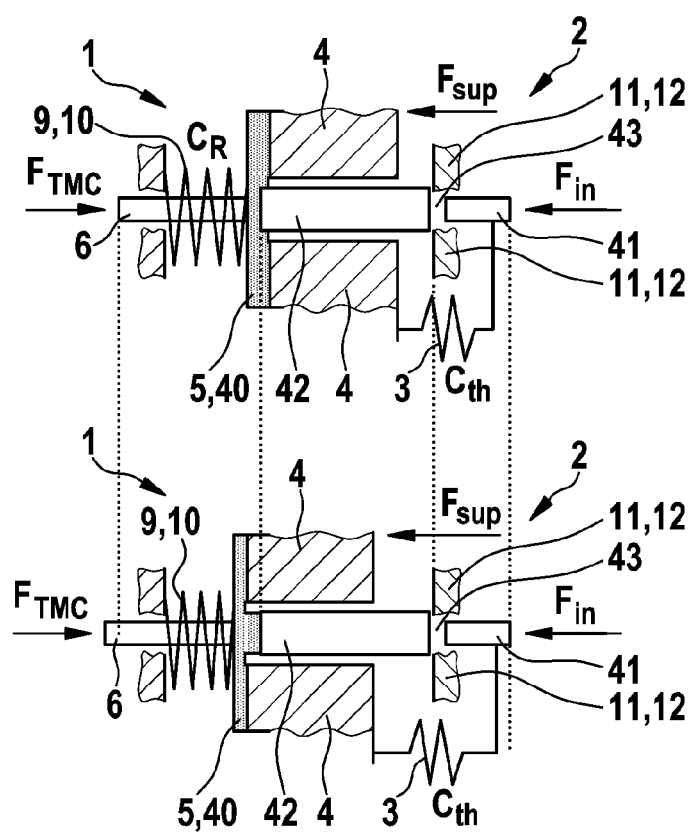
FIG. 4 shows a schematic representation of an exemplary embodiment variant of a brake booster according to FIG. 3.

The top part of FIG. 4 shows the idle mode of the braking system and thus of brake booster 1. Return spring 10 of brake booster 1, which in this case serves as force generation unit 9, rests, via force transmission unit 5 which is designed as a reaction disk 40, on input element 2. Here input element 2 is split and has a first subcomponent 41, which is actuatable by the driver, for generating the input force $F_{in}$, and separate from it, a second subcomponent 42 for transmitting the input force $F_{in}$ to reaction disk 40. The side of second subcomponent 42 facing away from reaction disk 40 rests on stop 12, which in the case of this exemplary embodiment serves as a part of reaction unit 11. A first force is thus actively applied to reaction disk 40 on the one hand via the preloaded return spring 10. This first force results via second subcomponent 42 and stop 12 in a reaction force acting in the opposite direction, which also acts on reaction disk 40. In this way, a force couple is applied to reaction disk 40, which results in the depicted deformation of reaction disk 40.

In the case of the shown exemplary embodiment, an air gap 43 is provided between first subcomponent 41 and second subcomponent 42 of input element 2, which is used for implementing a jump-in function and represents a desired free travel, which must first be overridden before input element 2 applies the input force $F_{in}$ directly to reaction disk 40.

If prior to a braking intent to be anticipated or immediately after detection of a braking intent in a time span before or immediately after detection of an actuation of input element 2, a support force $F_{sup}$ is generated by the actuator, not shown, then on the one hand output element 6 is shifted in the direction of the brake master cylinder. On the other hand, reaction disk 40, as shown in the bottom part of FIG. 4, is also deformed. This results in the situation that an output travel $S_{out}$ of output element 6 is overridden; the two subcomponents 41 and 42 of input element 2, however, remain precisely in their position until a contact force between input element 2 and reaction disk 40 (with loose coupling of second subcomponent 42 to reaction disk 40) or between input element 2 and stop 12 (with fixed coupling of second subcomponent 42 to reaction disk 40) is equal to zero. If support force $F_{sup}$ is increased further, then air gap 43 between first subcomponent 41 and second subcomponent 42 of input element 2 increases, if second subcomponent 42 is fixedly coupled to reaction disk 40. In the case of loose coupling of second subcomponent 42 of input element 2 to reaction disk 40, a further increase of support force $F_{sup}$ results in an additional air gap between reaction disk 40 and second subcomponent 42 of input element 2 and/or in an enlargement of air gap 43. Both the enlargement of air gap 43 and the formation of an additional air gap between the reaction disk and second subcomponent 42 of input element 2 would have the result, however, if no further measures were taken, that the total air gap would become too large for implementing the desired jump-in function. This effect may be compensated for in that air gap 43 in the idle mode, which is set during the manufacture of brake booster 1, is smaller than the desired air gap at the beginning of a braking operation. As a function of the ratio of the deformation characteristics (stiffnesses) of force transmission unit 5 and of the brake master cylinder, upon the piston of which output element 6 acts, and in conjunction with the braking system, a further increase in support force $F_{sup}$ may also result in a reduction of originally set air gap 43. In this case, in order to compensate for this effect, air gap 43 in the idle mode has to be set correspondingly larger than a desired air gap at the beginning of a braking operation.

Brake booster 1 is thereby in a position, prior to a braking intent to be anticipated or immediately after detection of a braking intent, to override an output travel $S_{out}$ without any feedback effect on first subcomponent 41 of input element 2 and is thus unnoticeable by the driver. This may be utilized in order to compensate for undesirable dead or free travel in the braking system. For this purpose, preload unit 8 is designed in such a way that brake booster 1, by applying support force $F_{sup}$, prior to a braking intent or immediately after detection of a braking intent shifts precisely into an initial position which corresponds to a conventional brake booster, without undesirable dead or free travel in the braking system.

In particular it is possible, provided that during the compensation for dead travel second subcomponent 42 of input element 2 remains jammed between stop 12 and force transmission unit 5, i.e., a pressure force is applied to second subcomponent 42, that air gap 43 remains constant.

As already mentioned, according to the present invention prior to a braking intent to be anticipated or immediately after detection of a braking intent in a time span before or immediately after detection of an actuation of the input element, a support force $F_{sup}$ is generated. The precise point in time may be set in a variety of ways. For example, a release of the accelerator pedal or an activation of a brake light switch, or even detection of a drag torque, may be interpreted as indications for a shortly to be anticipated actuation of the input element of the brake booster and may thus be used as a trigger for the successive increase in support force $F_{sup}$.

As an alternative to the exemplary embodiment shown in FIG. 4, input element 2 may also be situated movably in a tube, which in the idle mode of brake booster 1 is in contact with force transmission unit 5 and rests with its side facing away from force transmission unit 5 on stop 12. In this case, the reaction force is generated via the tube in cooperation with stop 12. Naturally, force transmission unit 5, i.e., for example reaction disk 40, may also rest directly on stop 12 without any effect on the applicability of the present invention due to appropriate structural design of brake booster 1.

What is claimed is:

1. A brake booster, comprising:
an input element which is actuatable by a driver,
an actuator for generating a support force,
an output element, to which an input force or the support force may be applied by the input element and/or the actuator and through which an actuating force may be applied to a piston of a brake master cylinder,
a force transmission unit having elastic properties, which is situated between the input element and the actuator on one end and the output element on an other end and which transmits the input force and/or the support force to the output element, and
a preload unit, which acts upon the force transmission unit such that a first part of a force couple is applied to a first side of the force transmission unit and a second part of the force couple is applied to a second side of the force transmission unit when the brake booster is in idle mode,
wherein between the input element and the force transmission unit or between a first and a second subcomponent of the input element an air gap is provided, wherein the air gap must be overridden before the input element applies the input force to the force transmission unit,
wherein at least one of: (i) the preload unit applies the first part of the force couple directly onto the first side of the force transmission unit, and (ii) the preload unit applies the second part of the force couple directly onto the second side of the force transmission unit.

2. The brake booster as recited in claim 1, wherein the actuator is configured as a pneumatic, a hydraulic, an electrohydraulic, an electromechanical or an electrothermal actuator.

3. The brake booster as recited in claim 1, wherein the force transmission unit is configured such that a deviation of a ratio of the support force to the input force from a predefined ratio causes a deflection of the force transmission unit.

4. The brake booster as recited in claim 3, wherein the force transmission unit is configured as an elastically deformable reaction disk or an elastic spring construction.

5. The brake booster as recited in claim 1, wherein the preload unit has a force generation unit, which applies the first part of the force couple to the force transmission unit in the idle mode.

6. The brake booster as recited in claim 5, wherein the force generation unit is configured as a spring element which is preloaded when the brake booster is in the idle mode and which rests on the first side on the force transmission unit.

7. The brake booster as recited in claim 6, wherein a return spring of the brake booster acts as the spring element.

8. The brake booster as recited in claim 6, wherein a spring of the brake master cylinder acts as the spring element.

9. The brake booster as recited in claim 5, wherein the preload unit includes a reaction unit which generates the second part of the force couple as a reaction force to the first part of the force couple.

10. The brake booster as recited in claim 9, wherein the reaction unit includes a stop, on which the second side of the force transmission unit at least one of directly or indirectly rests.

11. The brake booster as recited in claim 10, wherein the first subcomponent is actuatable by the driver, for generating the input force and the second subcomponent is configured for transmitting the input force to the force transmission unit and the stop is situated such that in the idle mode of the brake booster a side of the second subcomponent of the input element which faces away from the force transmission unit rests on the stop.

12. The brake booster as recited in claim 10, wherein the input element is situated movably in a tube while the brake booster is in idle mode, and wherein the brake booster is in contact with the force transmission unit and rests with a side of the brake booster facing away from the force transmission unit on the stop.

13. The brake booster as recited in claim 1, wherein the air gap in the idle mode is smaller or larger than a desired air gap at a beginning of a braking operation.

14. The brake booster as recited in claim 1, wherein the stop is situated in an area between the force transmission unit and the input element.

15. The brake booster as recited in claim 1, wherein the air gap is adjustable so that a size of the air gap represents a force at which the brake booster transfers from a non-muscular energy mode to an energy-assisted mode.

16. A method for operating a brake booster, the method comprising:
   selectively activating, at an end of a first side of a force transmission unit having elastic properties, a support force generated by an actuator;
   receiving, at an other end of the first side of the force transmission unit, an input force from an input element actuated by a driver;
   applying to an output element, by a second side that is opposite to the first side of the force transmission unit, an actuating force that further is applied via the output element to a piston of a brake master cylinder;
   when the brake booster is in an idle mode, engaging the force transmission unit, by a preload unit, with a force couple having a first part of the force couple engaging the first side of the force transmission unit and a second part of the force couple engaging the second side of the force transmission unit; and
   when a braking intent is at least one of:
      (i) anticipated, activating the support force immediately after anticipation of the braking intent, in a time span before detection of an actuation of the input element, and
      (ii) detected, activating the support force immediately after detection of the braking intent, in a time span immediately after detection of the actuation of the input element,
   wherein between the input element and the force transmission unit or between a first and a second subcomponent of the input element an air gap is provided, wherein the air gap must be overridden before the input element applies the input force to the force transmission unit,
   wherein at least one of: (i) the preload unit engages the first part of the force couple directly with the first side of the force transmission unit, and (ii) the preload unit engages the second part of the force couple directly with the second side of the force transmission unit.

17. The method as recited in claim 16, further comprising:
   calculating a ratio of the support force to the input force by:
      measuring a first distance between a point of contact of the output element on the force transmission unit to a point of contact of the support force on the force transmission unit,
      measuring a second distance between a point of contact of the output element on the force transmission unit to a point of contact of the input element on the force transmission unit, and
      dividing the measured first distance by the measured second distance; determining a deviation between the calculated ratio and a predefined ratio; and determining, based on the deviation, the deflection of the force transmission unit.

18. The method as recited in claim 16, wherein the first part of the force couple is actively applied by the preload unit.

19. The method as recited in claim 17, wherein the preload unit shifts based on the determined deflection.

* * * * *